(12) United States Patent
Walley

(10) Patent No.: US 9,448,670 B2
(45) Date of Patent: Sep. 20, 2016

(54) METHODS AND SYSTEMS FOR HYBRID MULTI-TOUCH CAPACITIVE (MTC) AND ACTIVE STYLUS TOUCH DEVICE

(71) Applicant: Broadcom Corporation, Irvine, CA (US)

(72) Inventor: John Walley, Ladera Ranch, CA (US)

(73) Assignee: Broadcom Corporation, Irvine, CA (US)

(*) Notice: Subject to any disclaimer, the term of this patent is extended or adjusted under 35 U.S.C. 154(b) by 172 days.

(21) Appl. No.: 13/754,285

(22) Filed: Jan. 30, 2013

(65) Prior Publication Data

US 2014/0184554 A1  Jul. 3, 2014

Related U.S. Application Data

(60) Provisional application No. 61/747,504, filed on Dec. 31, 2012.

(51) Int. Cl.

| G06F 3/045 | (2006.01) |
|---|---|
| G06F 3/044 | (2006.01) |
| G06F 3/041 | (2006.01) |
| G06F 3/0354 | (2013.01) |

(52) U.S. Cl.
CPC .......... *G06F 3/044* (2013.01); *G06F 3/03545* (2013.01); *G06F 3/0416* (2013.01); *G06F 2203/04104* (2013.01)

(58) Field of Classification Search
None
See application file for complete search history.

(56) References Cited

U.S. PATENT DOCUMENTS

| 2009/0167713 A1* | 7/2009 | Edwards ............... G06F 3/0416 345/173 |
|---|---|---|
| 2009/0182211 A1* | 7/2009 | Diab et al. ................... 600/323 |
| 2009/0185062 A1* | 7/2009 | Ng et al. ...................... 348/302 |
| 2009/0270055 A1* | 10/2009 | Rofougaran ................. 455/120 |
| 2009/0326682 A1* | 12/2009 | Junk et al. ..................... 700/65 |
| 2010/0007625 A1* | 1/2010 | Jiang et al. .................. 345/173 |
| 2010/0155153 A1* | 6/2010 | Zachut ....................... 178/18.03 |
| 2010/0195701 A1* | 8/2010 | Letunov et al. ............. 375/135 |
| 2010/0237065 A1* | 9/2010 | Cho et al. .................... 219/624 |
| 2010/0252335 A1* | 10/2010 | Orsley ....................... 178/18.03 |
| 2012/0019727 A1* | 1/2012 | Zhai et al. ................... 348/607 |
| 2012/0043977 A1* | 2/2012 | Kremin et al. .............. 324/686 |
| 2012/0050207 A1* | 3/2012 | Westhues et al. ........... 345/174 |
| 2012/0050216 A1* | 3/2012 | Kremin .................. G06F 3/044 345/174 |
| 2012/0068964 A1* | 3/2012 | Wright et al. ............... 345/174 |
| 2012/0105361 A1* | 5/2012 | Kremin et al. .............. 345/174 |
| 2012/0162124 A1* | 6/2012 | Lin .............................. 345/174 |
| 2012/0162141 A1* | 6/2012 | Maki et al. .................. 345/175 |
| 2012/0195214 A1* | 8/2012 | Xin et al. ..................... 370/252 |
| 2012/0239327 A1* | 9/2012 | Bills et al. ..................... 702/65 |

(Continued)

*Primary Examiner* — Adam R Giesy
(74) *Attorney, Agent, or Firm* — Sterne, Kessler, Goldstein & Fox P.L.L.C.

(57) ABSTRACT

Embodiments for a hybrid multi-touch capacitive (MTC) and active stylus touch device are provided. Embodiments enable various ways for reusing system resources to enable simultaneous detection of conducting objects in contact with the device and/or active styluses in proximity to the device. In an embodiment, receiver channels are reused in a time multiplexed manner between an MTC mode and an active stylus mode of operation. In another embodiment, the use of system resources, including receiver channels, is adjusted based on the presence/absence of conducting objects and/or active styluses. Embodiments for improving the detection of conducting objects and/or active styluses are also provided, including embodiments for reducing the interference between conducting objects and active styluses.

20 Claims, 9 Drawing Sheets

(56) References Cited

U.S. PATENT DOCUMENTS

| | | | |
|---|---|---|---|
| 2012/0262411 A1* | 10/2012 | Ahn et al. | 345/174 |
| 2013/0106714 A1* | 5/2013 | Shahparnia et al. | 345/173 |
| 2013/0106715 A1* | 5/2013 | Shahparnia et al. | 345/173 |
| 2013/0106912 A1* | 5/2013 | Um | 345/649 |

* cited by examiner

METHODS AND SYSTEMS FOR HYBRID MULTI-TOUCH CAPACITIVE (MTC) AND ACTIVE STYLUS TOUCH DEVICE

CROSS-REFERENCE TO RELATED APPLICATIONS

The present invention claims the benefit of U.S. Provisional Application No. 61/747,504, filed Dec. 31, 2012, which is incorporated herein by reference in its entirety.

BACKGROUND

1. Field of the Invention

The present disclosure relates generally to touch-sensitive devices.

2. Background Art

There is a growing demand for touch-sensitive devices, including smart phones, tablets, computers, gaming devices, and televisions, for example. Today, touch-sensitive devices employ a variety of approaches, including for example resistive, capacitive, optical, and piezoelectric technologies.

Capacitive technologies rely on an electrical conductor (e.g., human fingertip) touching the device screen to vary the electrostatic field at the touch location. The electrostatic field variation can be measured as a change in capacitance at the touch location. A multi-touch capacitive (MTC) technology is a capacitive technology capable of simultaneously detecting multiple touches to the device screen.

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure.

The present disclosure will be described with reference to the accompanying drawings. Generally, the drawing in which an element first appears is typically indicated by the leftmost digit(s) in the corresponding reference number.

DETAILED DESCRIPTION OF EMBODIMENTS

For purposes of this discussion, the term "module" shall be understood to include at least one of software, firmware, and hardware (such as one or more circuits, microchips, or devices, or any combination thereof), and any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

Figure 1:
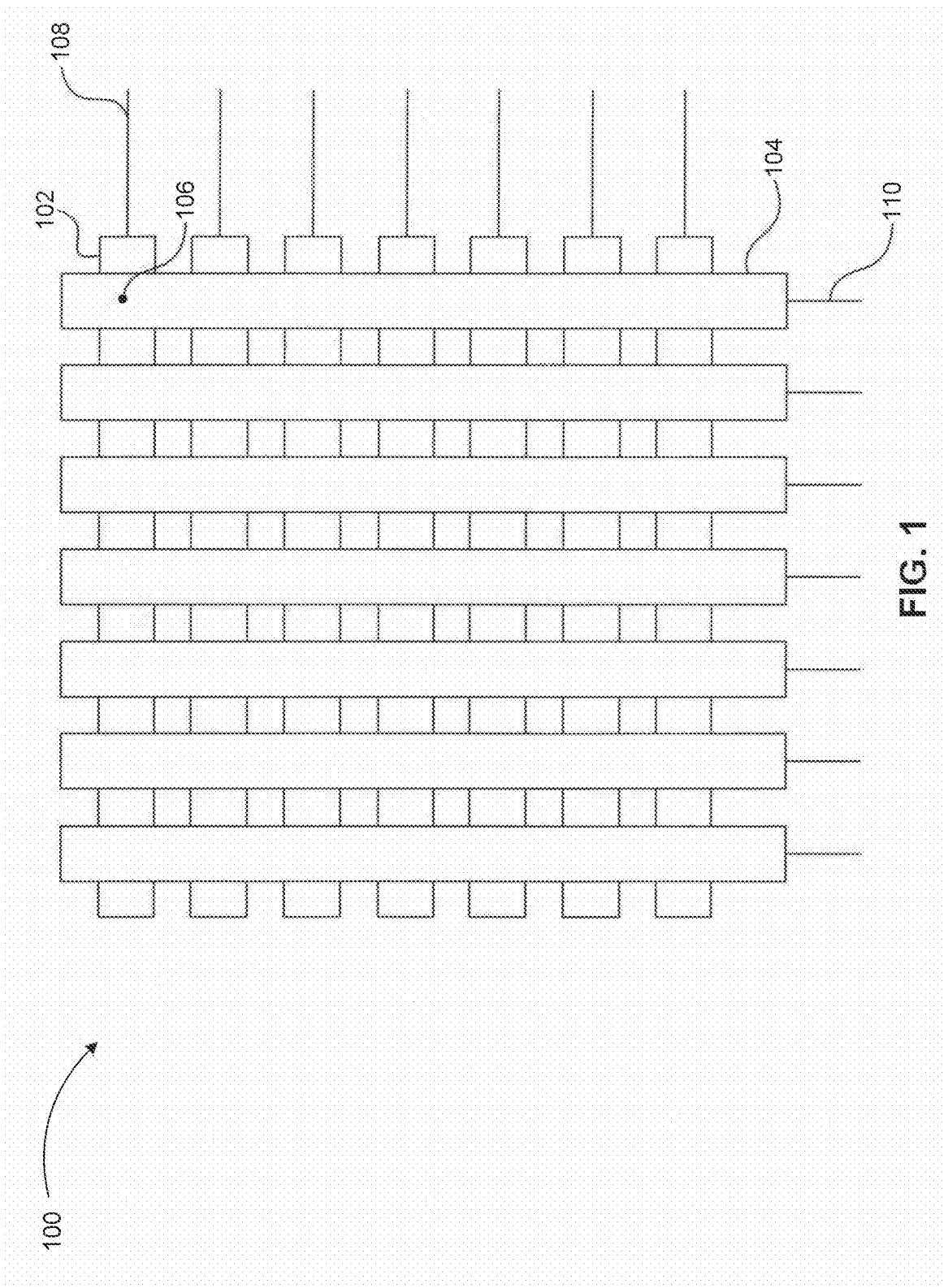
FIG. 1 illustrates an example multi-touch capacitive (MTC) system.

FIG. 1 illustrates an example multi-touch capacitive (MTC) system grid 100. Example MTC system grid 100 is provided for the purpose of illustration and is not limiting of embodiments. Example MTC system grid 100 can be used in a touch-sensitive device, such as a smart phone, tablet, computer, gaming device, or television, for example.

As shown in FIG. 1, example MTC system grid 100 includes a grid having a plurality of horizontal conductive lines 102 disposed in a first plane and a plurality of vertical conductive lines 104 disposed in a second plane, spatially separated from the first plane. Typically, horizontal lines 102 and vertical lines 104 are made from transparent conductive material, such as indium-tin-oxide (ITO), and are disposed on top of a glass substrate and below a protective screen of the device in which MTC system grid 100 is embedded. The close proximity of horizontal lines 102 to vertical lines 104 causes a mutual capacitance to be generated at or near intersection points 106 of horizontal lines 102 and vertical lines 104. In other embodiments, grid 100 may have a different shape, different numbers of horizontal/vertical conductive lines, and different ITO layers, for example.

In operation, horizontal lines 102 (or alternatively vertical lines 104) are driven sequentially using driving lines 108. Typically, a driver circuit (not shown in FIG. 1) is used to generate electrical signals sequentially over driving lines 108 in a periodic cycle. The mutual capacitances at intersection points 106 are measured (sequentially for each driven horizontal line 102) using sensing lines 110 by a sensing circuit (not shown in FIG. 1). For example, the mutual capacitance at an intersection point 106 can be measured by measuring a current value produced from applying an AC voltage to the respective horizontal line 102. The sensing circuit provides the measurements (including a measurement for each intersection point 106) to a controller (not shown in FIG. 1), which processes the measurements to determine the presence and location of a conducting object (if any) over the grid.

When a conducting object (e.g., human fingertip or conductive stylus) comes in proximity to an intersection point 106 (e.g., by touching the protective screen disposed above the grid), the object capacitively couples to the electrically driven horizontal line 102 disturbing the mutual capacitance generated between horizontal line 102 and vertical line 104 at intersection point 106. The disturbance in the mutual capacitance at intersection point 106 is detected by the controller from the measurements provided by the sensing circuit, indicating the presence of the conducting object in proximity to intersection point 106 and the touch location of the conductive object on the protective screen. For example, the controller may generate a heat map comprising differences between the current measurements and respective measurements made a priori without any conductive objects affecting the grid. The presence of the conducting object in proximity to an intersection point 106 corresponds to a relatively large difference in the heat map at the intersection point 106. In the same manner, multiple concurrent touches to the protective screen can be detected and the movement of a conducting object on the screen can be tracked.

Generally, touch-sensitive devices have limitations when controlled by a human finger. For example, touch display objects can be spaced too close apart that their selection can be difficult by a human fingertip. Generally, this problem can be solved by the use of styluses, which provide an alternate way of interfacing with touch-sensitive devices. A stylus is typically a pen-shaped conductive object with a fine tip that, when held by a human, creates a conductive path between the human body and the touch-sensitive device.

Styluses can be passive or active. A passive stylus is made of passive components (e.g., resistors, capacitors, inductors) and thus does not require an energy source to operate. Generally, however, because the stylus has a fine tip (e.g., 1 $mm^2$), the mutual capacitance disturbance that can be delivered by a passive stylus can be small, which makes the stylus difficult to detect without significant processing by the controller.

An active stylus includes active components (e.g., transistors, diodes, amplifiers, integrated circuits, etc.) that require an energy source to operate. The energy source may be provided externally (e.g., from the touch-sensitive device) or internally generated within the active stylus (e.g., battery, energy harvesting circuit, etc.). Because active styluses include active components, they provide enhanced capacitive coupling to the touch-sensitive device and can be more easily and accurately detected than passive styluses. In addition, as further described below, active styluses can provide no-contact and data input features not available with passive styluses.

Figure 2:
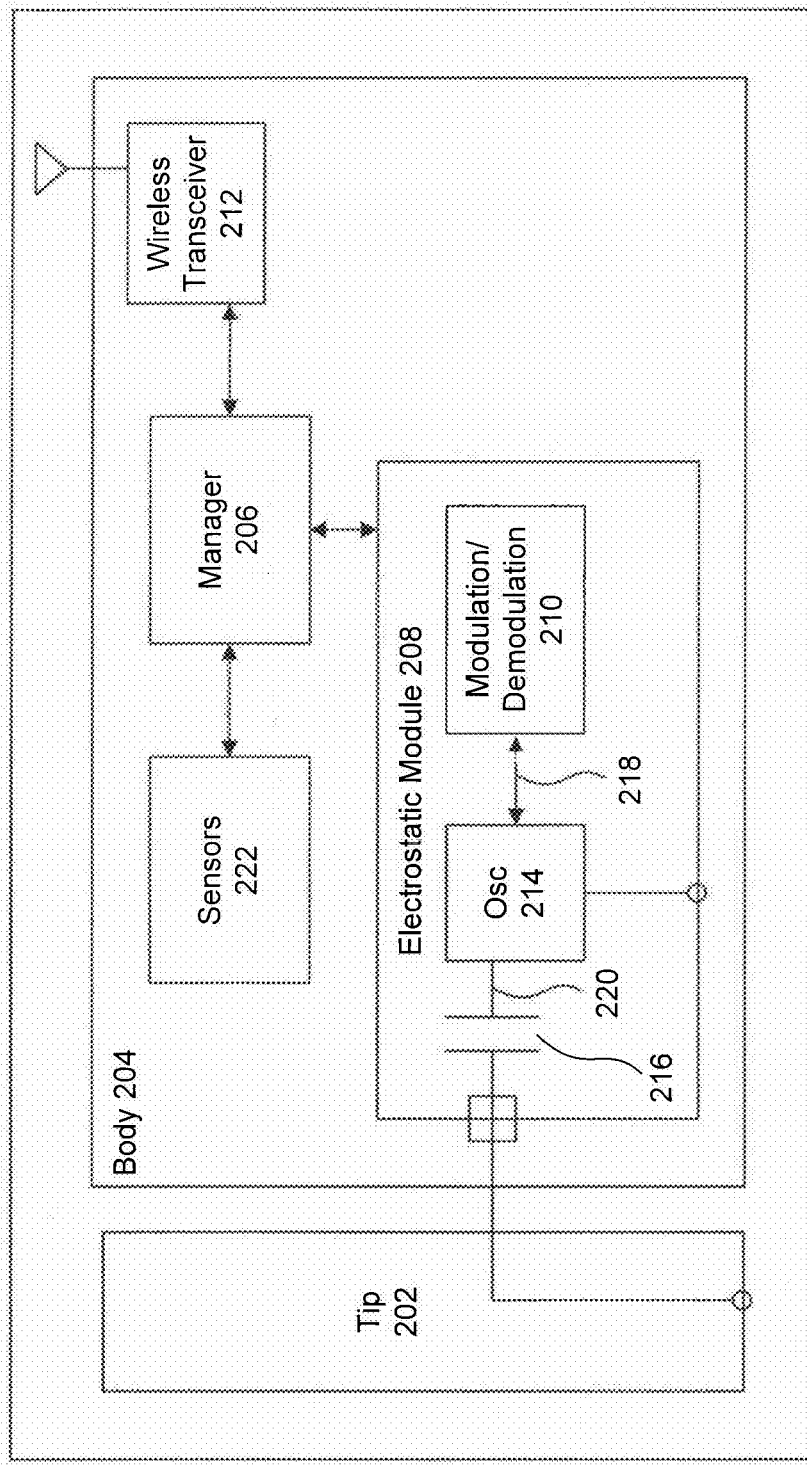
FIG. 2 illustrates an example active stylus according to an embodiment.

FIG. 2 illustrates an example active stylus 200 according to an embodiment. Example active stylus 200 is provided for the purpose of illustration and is not limiting of embodiments. As shown in FIG. 2, example active stylus 200 includes a tip 202 and a body 204. Tip 202 may include an electrode and may extend outwardly from body 204 in an embodiment. Body 204 includes a manager module 206, an electrostatic module 208, a wireless transceiver and associated antenna 212, and sensors 222. Electrostatic module 208 includes a modulation/demodulation module 210, an oscillator 214, and a capacitor 216. Sensors 222 can include a variety of sensors, including a microphone, a touch sensor, a pressure sensor, a motion sensor, a gyroscope, an accelerometer, etc. Sensors 222 can include MEMS sensors.

In embodiments, manager 206 can use one or more of module 208 and wireless transceiver 212 to enable active stylus 200 to communicate with a touch-sensitive device. Communication with the touch-sensitive device can be one-way (only from active stylus 200 to the touch-sensitive device) or two-way. Communication via module 208 is done by manipulation of electrostatic fields as further described below. When communication via module 208 is two-way, communication can be half duplex or full duplex. Communication via wireless transceiver 212 is done via a wireless channel with a counterpart wireless transceiver at the touch-sensitive device. Wireless transceiver 212 can implement any known wireless protocol, including for example Bluetooth, Bluetooth Low Energy, or Zigbee, for example.

According to embodiments, manager 206 can decide which of module 208 or wireless transceiver 212 to use for sending/receiving information to/from the touch-sensitive device. In an embodiment, manager 206 uses module 208 to convey position information (x, y, and optionally z (height) coordinates) of active stylus 200, and uses wireless transceiver 212 to send/receive additional information to enhance the detection of the active stylus by the device and/or to enable additional features.

In an embodiment, manager 206 uses wireless transceiver 212 and/or module 208 to send a variety of information that can enhance the detection of active stylus 200 by a touch-sensitive device. Information that may be sent may include the type, manufacture model, transmit frequencies, and capabilities of active stylus 200. In another embodiment, sensors 222 provide manager 206 with information that can be used to determine the position of the active stylus. The active stylus can send this information to the touch-sensitive device via wireless transceiver 212 to augment the information sent by module 208. Manager 206 can also use wireless transceiver 212 to receive information from the touch-sensitive device, including for example transmit frequencies to use to reduce interference.

In another embodiment, manager 206 receives information from sensors 222 and uses wireless transceiver 212 and/or module 208 to send this information to the touch-sensitive device. For example, in an embodiment, sensors 222 include a gyroscope that provides a tilt angle of active stylus 200 to manager 206. Manager 206 can use wireless transceiver 212 to send this information to the touch-sensitive device, where it can be used by an application for enhanced features with the active stylus. In another embodiment, sensors 222 can be used to enable remote control features, whereby active stylus 200 controls the touch-sensitive device in the manner of a remote control, in such features, active stylus 2.00 may not need to be in proximity of the touch-sensitive device. For example, in an embodiment, sensors 222 include a microphone, which can be used by a user to input voice commands into active stylus 200. Active stylus 200 can then convey the voice commands using wireless transceiver 212 and/or module 208 to the touch-sensitive device.

Figure 8:
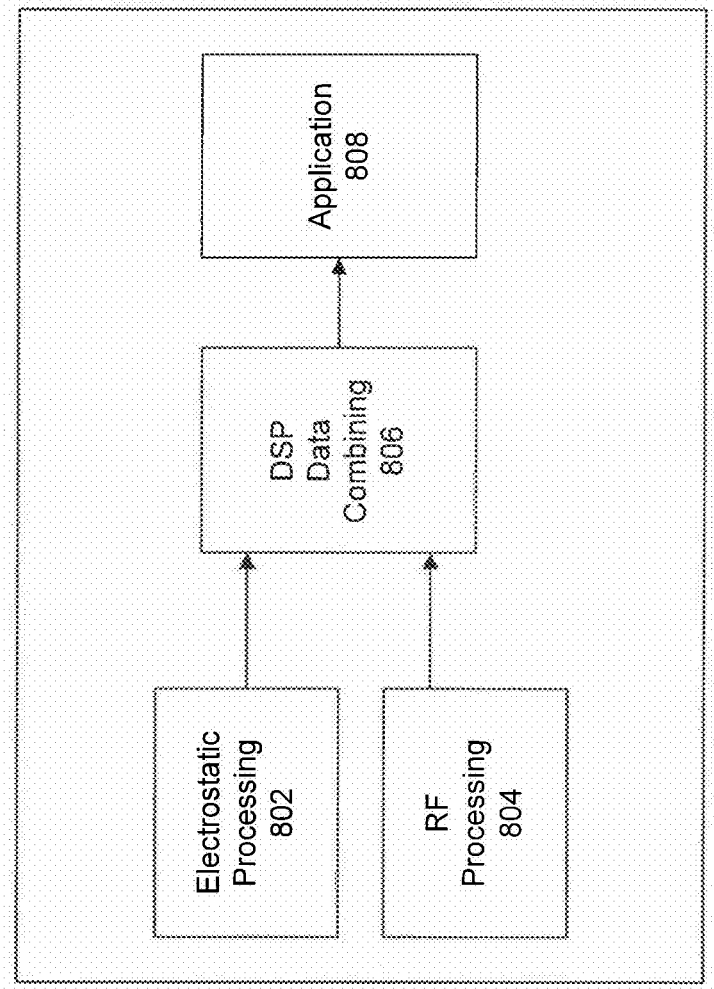
FIG. 8 illustrates an example touch system according to an embodiment.

At the touch-sensitive device, information received from module 20$ and wireless transceiver 212 of active stylus 200 can be combined for better detection of the active stylus and/or enhanced features. FIG. $ illustrates an example touch system 800 according to an embodiment, which can be used to implement the above described features. As shown in FIG. 8, touch system 800 includes an electrostatic processing module 802, a radio frequency (RF) processing module 802, a digital signal processing (DSP) data combining module 806, and an application 808. Module 802 is configured to communicate (transmit/receive) via electrostatic means with the active stylus. RF processing module 804 is configured to communicate (transmit/receive) via wireless RF means with the active stylus, for example with wireless transceiver 212. DSP data combining module 806 receives signals from modules 802 and 804, and applies digital processing on the signals. In an embodiment, the signals from modules 802 and 804 each includes position information of the active stylus, and module 806 combines the position information. Module 806 then provides the combined information to application 808.

Returning to FIG. 2, in an embodiment, example active stylus 200 is powered by an energy source that can be embedded within body 204 or located outside of active stylus 200. An embedded energy source can include a battery (rechargeable or otherwise), a super capacitor, an ultra capacitor, an energy harvesting circuit (e.g., inductive, capacitive, etc.), and/or a solar cell, for example.

In an embodiment, manager 206 receives energy from the energy source and controls the powering of different components of active stylus 200. In another embodiment, manager 206 responds to a pressure signal from a pressure sensor to power up/down components of the active stylus. For example, when the pressure signal goes active, indicating that active stylus 200 is now being held by a human, manager 206 powers up one or more components of active stylus 200 as appropriate. When the pressure signal becomes inactive, indicating that active stylus 200 is not in use, manager 206 powers down one or more components of active stylus 200 as appropriate.

In another embodiment, the pressure signal is used to generate a varying electric field from tip 202 to enhance the capacitive coupling of active stylus 200 to a touch-sensitive device. This allows for operations to be performed without making contact with the protective screen of the touch-sensitive device. The pressure signal or signals from other sensors 222 can also be data modulated by modulation module 210 (e.g., amplitude modulation (AM), frequency modulation (FM), etc.) to generate signal 218. Signal 218 can thus carry information. In an embodiment, the pressure signal is modulated when a button signal (not shown) indicates that a button on active stylus 200 is pressed, and is not modulated otherwise. For example, the pressure signal can be data modulated by pressing the button to perform a drag-and-drop operation on objects or to perform mouse-like clicks. Signal 218 can be frequency up-converted using oscillator module 214 to generate a signal 220. Signal 220 is capacitively coupled by capacitor 216 to tip 202 to generate the varying electric field at tip 202.

When tip 202 is brought in proximity of a touch-sensitive device, the varying electric field being generated by tip 202 results in capacitive coupling between tip 202 and the conductive grid of the touch-sensitive device. The electric field generated by tip 202 is spatially sensitive, however, such that capacitive coupling is substantially stronger at grid locations touched (or hovered above) by tip 202 than at other locations of the grid. For example, if active stylus 200 is used with MTC system grid 100, the bringing of active stylus 200 in proximity to an intersection point 106 (e.g., by touching the protective screen or by hovering above the protective screen at intersection 106) results in tip 202 capacitively coupling with the respective horizontal line 102 and vertical line 104 that intersect at intersection point 106. The electric field can be detected using the same sensing circuit described above with reference to FIG. 1, by making measurements on both driving lines 108 and sensing lines 110. In an embodiment, the sensing circuit includes multiple receiver channels, with each channel dedicated to an intersection point 106. The receiver channel can be time multiplexed to make measurements on the respective driving line 108 and sensing line 110 that correspond to the intersection point 106. By making measurements on all (or some) of driving lines 108 and sensing lines 110, the presence and location of active stylus 200 relative to MTC system grid 100 can be determined.

In the same manner, driving lines 108 and/or sensing lines 110 can be driven to generate signals that capacitively couple with tip 202 of active stylus 200. This capacitive coupling can be used to transmit information from the touch-sensitive device to the active stylus, which can be demodulated using module 210 and then provided to manager 206 for further processing.

Figure 3:
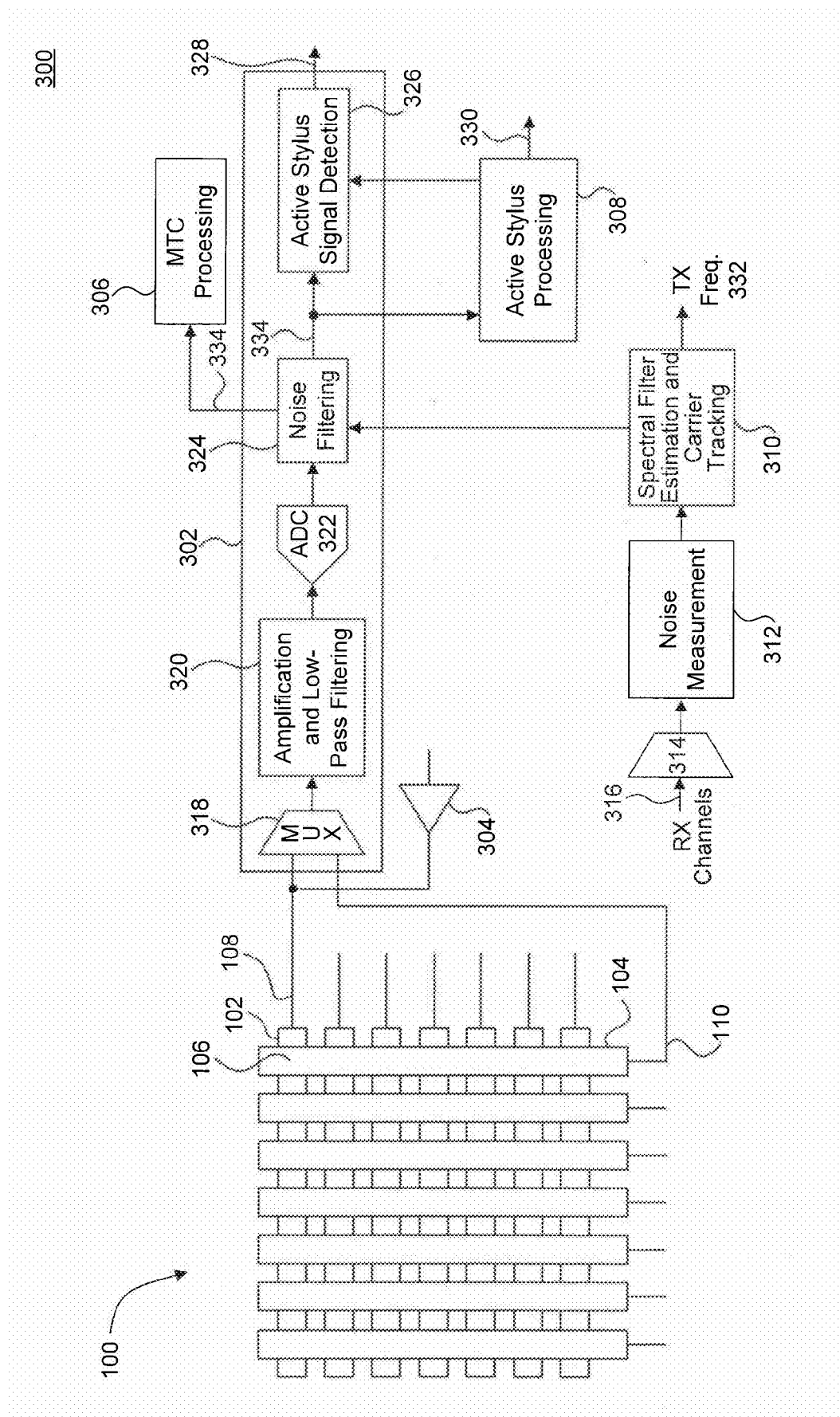
FIG. 3 illustrates an example hybrid MTC and active stylus touch system according to an embodiment.

FIG. 3 illustrates an example hybrid MTC and active stylus touch system 300 according to an embodiment. Example system 300 is provided for the purpose of illustration, and is not limiting. For the purpose of illustration, example system 300 is shown implementing example MTC system grid 100 described above in FIG. 1. However, as would be understood by a person of skill in the art embodiments are not limited to this implementation and other grid types can also be used.

As shown in FIG. 3, example system 300 includes a grid 100, a receiver channel 302, a transmitter 304, an MTC processing module 306, an active stylus processing module 308, a spectral filter estimation and carrier tracking module 310, a noise measurement module 312, and a multiplexer module 314. For the purpose of simplification, a single receiver channel 302 and transmitter 304 are shown in example system 300. As would be understood by a person of skill in the art, however, example system 300 can include any number of receiver channels 302 and transmitters 304. For example, in an embodiment, example system 300 includes the same number of receiver channels 302 as sensing lines 110. In another embodiment, example system 300 includes the same number of receiver channels 302 as sensing lines 110 and driving lines 108, allowing signals to be received concurrently on both sensing lines 110 and driving lines 108.

In an embodiment, example system 300 includes two modes of operation, an MTC mode and an active stylus mode. In an embodiment, system 300 begins in the MTC mode scanning for conducting objects over grid 100. Simultaneously, system 300 may passively search for active styluses in proximity to grid 100 based on signals received from the MTC mode of operation. If an active stylus is detected, system 300 enables the active stylus mode for actively tracking and demodulating the detected active stylus (in addition to MTC processing). In an embodiment, system 300 time multiplexes the MTC mode and the active stylus mode within each receiver channel 302 as further described below. In another embodiment, system 300 multiplexes the MTC mode (scanning for conducting objects) and the active stylus mode (scanning for active styluses) within each receiver channel 302 even though an active stylus has not yet been detected.

In an embodiment, the MTC mode includes transmitting a transmit signal by transmitter 304 over driving line 108, and receiving a corresponding output signal over sensing line 110 by receiver channel 302. The output signal is a function of the capacitance measured at intersection point 106. In an embodiment, the output signal is first provided to an amplification and low-pass filtering module 302 (via a multiplexer 318), before being converted from analog to digital in analog-to-digital converter (ADC) 322.

The digital output of ADC 322 is noise filtered by noise filtering module 324 to generate a noise-filtered output signal 334. In an embodiment, noise filtering module 324 includes a band-pass filter configured according to a frequency of the transmit signal. In addition, noise filtering module 324 can be configured to null certain harmonics that can be identified based on the system. For example, the periodic refreshing of the display (e.g., at a 60 KHz rate) can cause certain harmonics to be imposed over the received signal. Such harmonics can be reduced by noise filtering module 324.

In another embodiment, example system 300 includes a noise measurement mechanism which allows the system to dynamically adapt based on measured noise, for example. Specifically, as shown in FIG. 3, receiver channel signals 316 (which can be derived from multiple receiver channels 302) are fed into a noise measurement module 312, which measures noise over grid 100. The output of noise measurement module 312 is fed to module 310, which generates configuring parameters for noise filtering module 324. In an embodiment, module 324 generates noise filtering parameters periodically and/or based on the current mode of operation of example system 300. The generated noise filtering parameters may vary depending on the mode of operation.

In addition, module 324 may determine a transmit frequency 332 for the transmit signal generated by transmitter 304. In an embodiment, module 324 selects transmit frequency 332 to improve detection of conducting objects in MTC mode based on measured noise in the system. Additionally or alternatively, module 324 may select transmit frequency 332 to reduce interference between MTC mode signals and active stylus mode signals. For example, module 324 may select transmit frequency 324 such that it is sufficiently spaced out in the frequency spectrum from signals emitted by an active stylus. In an embodiment, module 310 has knowledge of operating frequencies of known active styluses and therefore selects transmit frequency 332 to avoid such known frequencies.

Output signal 334 of noise filtering module 324 is provided to MTC processing module 306 in MTC mode. MTC processing module 306 processes output signal 334 (along with multiple other similar outputs received from multiple other similar receiver channels 302) to determine the presence of and location of conducting objects, if any, over grid 100. In an embodiment, MTC processing module 306 removes the phase information and extracts the amplitude information from output signal 334. The amplitude information from multiple other similar output signals is then used to generate a heat map representative of differences in capacitance between current measurements and respective measurements made a priori without any conductive objects affecting the grid. The heat map is then provided to a processor (e.g., software) which analyzes the heat map to detect the presence of any conductive objects over grid 100.

In an embodiment, output signal 334 of noise filtering module 324 is also provided to active stylus signal detection module 326. Active stylus signal detection module 326 processes output signal 334 to generate an output signal 328. In an embodiment, output signal 328 (along with similar outputs from other similar modules 326 from various receiver channels 302) is provided to a processor (e.g., software) which determines the presence of any active styluses in proximity to system 300. In an embodiment, the processor searches for known signatures of active styluses in output signal 328 to determine the presence of an active stylus.

If an active stylus is detected based on output signal 328, in an embodiment, system 300 enables additional active stylus processing to actively track and demodulate any information being transmitted by the active stylus. Specifically, system 300 may alternate the use of receiver channel 302 between MTC processing and active stylus processing. For example, in a given cycle, system 300 may perform MTC processing whereby driving lines 108 are used for transmitting over horizontal lines 102 and sensing lines are used for receiving over vertical lines 104, and then switch to active stylus processing whereby both driving lines 108 and sensing lines 110 are used for receiving over horizontal lines 102 and vertical lines 104 respectively.

In an embodiment, in active stylus mode, a driving line 108 and a sensing line 110 that share a receiver channel 302 are time multiplexed using multiplexer 318 for input into receiver channel 302. In another embodiment (not shown in FIG. 3), separate receiver channels are provided for driving lines 108 and sensing lines 110 such that no time multiplexing is required. Processing of driving line 108 and sensing line 110 is identical for the purpose of active stylus processing and includes similar processing as described above in modules 320, 322, and 324.

In an embodiment, once an active stylus is detected, module 324 is configured according to a known signature (which includes a transmit frequency) of the detected active stylus. Output signal 334 of module 324 is then provided to active stylus signal detection module 326. As above, module 326 generates output signal 328 based on output signal 334, which is used to track the active stylus over grid 100. In an embodiment, a three-dimensional position of the active stylus can be estimated based on output signal 328.

Additionally, output signal 334 may be provided to active stylus processing module 308. In an embodiment, active stylus processing module 308 receives multiple Output signals 334 from multiple receiver channels 302 and selects a subset of the received output signals for processing. For example, module 308 may select the strongest output signal 334 (or the N strongest, where N is an integer) for processing. In processing output signal 334, module 308 data demodulates output signal 334 (if the signal emitted by the active stylus is data modulated) to generate a demodulated information Signal 330. In an embodiment, signal 330 is provided to another processor (e.g., software) for further processing to identify information being communicated by the active stylus (e.g., button pressed).

Figure 4:
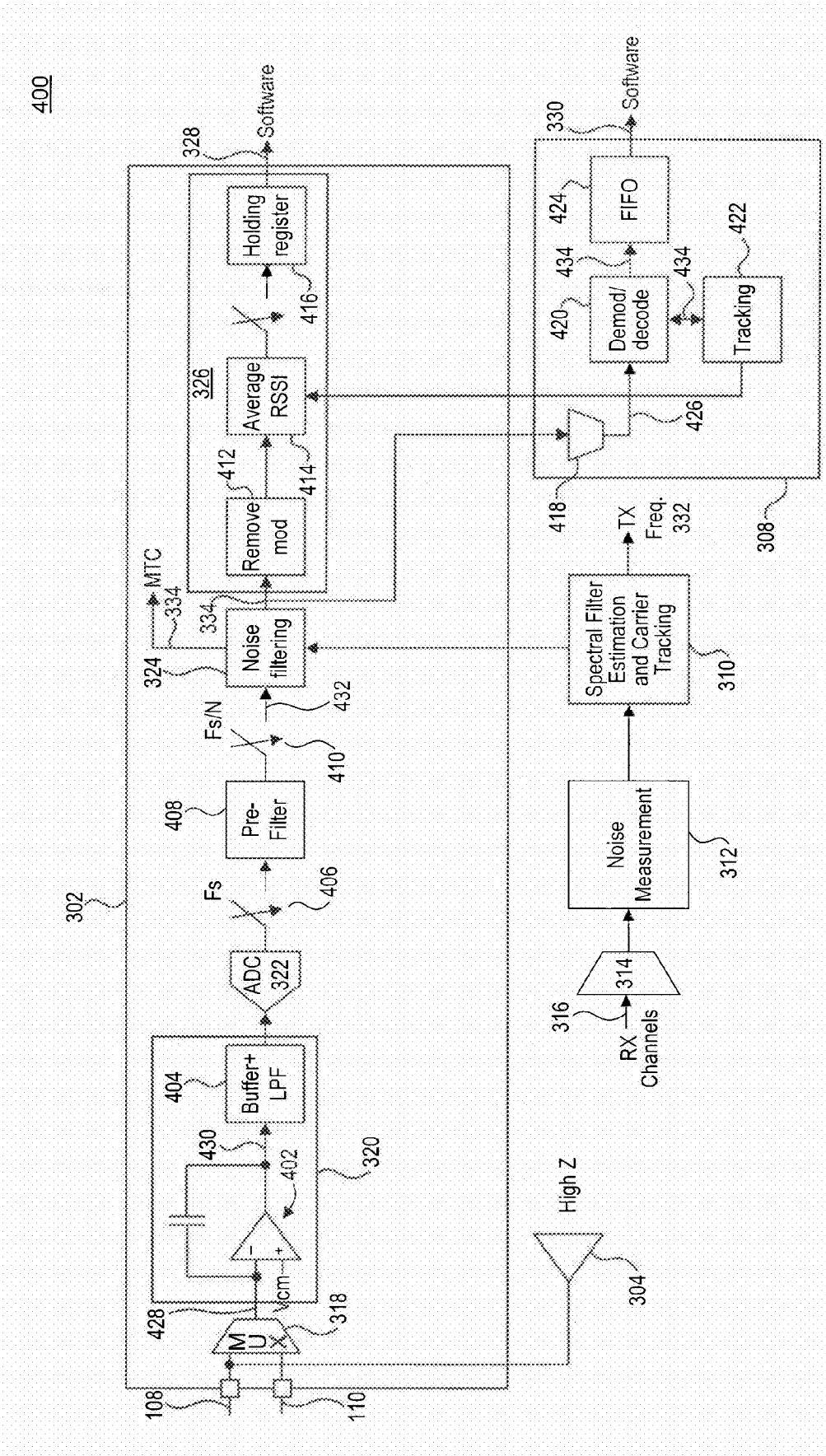
FIG. 4 illustrates another example hybrid MTC and active stylus touch system according to an embodiment.

FIG. 4 illustrates another example hybrid MTC and active stylus touch system 400 according to an embodiment. Example system 400 is provided for the purpose of illustration and is not limiting. Example system 400 may be an embodiment of example system 300 described above in FIG. 3. As such, example system 400 may be used with example MTC system grid 100 described above in FIG. 1. For the purpose of simplification, a single receiver channel 302 and transmitter 304 are shown in example system 400. As would be understood by a person of skill in the art, however, example system 400 can include any number of receiver channels 402 and transmitters 404.

Example system 400 includes similar components as example system 300 described above in FIG. 3. Additionally, example system 400 include particular implementations of amplification and low-filtering module 320, active stylus signal detection module 326, and active stylus processing module 308.

As shown in FIG. 4, module 320 includes a transconductance amplifier 402 and a low pass filter 404. Transconductance amplifier 402 is configured to convert a current signal 428 from multiplexer 318 into a voltage signal 430. Low pass filter 404 is configured to filter voltage signal 430 and to provide the filtered voltage signal to ADC 322. The filtered voltage signal is then digitized by ADC 322, sampled at a sampling frequency $F_s$ by a switch 406, filtered again by a pre-filter 408, and then re-sampled at a sampling frequency $F_s/N$ by a switch 410, before being input as input signal 432 into noise filtering module 324.

Noise filtering module 324 acts on input signal 432 as described above with respect to FIG. 3 to generate output signal 334. Output signal 334 is provided to module 326. As shown in FIG. 4, module 326 includes a module 412 for removing any data modulation from output signal 334, and a module 414 for measuring the power (envelope power) present in output signal 334. In an embodiment, module 414 performs RSSI (Received Signal Strength Indication) averaging over output signal 334. The output of module 414 is then sampled by a switch 416 and stored in a holding register

416. Output 328 of holding register 416 is acted upon by another processor (e.g., software) to detect the presence of/track an active stylus.

Noise filtering module 324 also provides output signal 334 to module 308. As shown in FIG. 4, module 308 includes a combiner 418, a demodulation module 420, a tracking module 422, and a FIFO (First In First Out) buffer 424. As described above, module 308 receives output signals 334 from multiple receiver channels 302. Combiner 418 selectively combines the received output signals 334 to generate a signal 426. For example, signal 426 may be a weighted average of all received output signals 334, with each output signal 334 having a respective weight.

Figure 5:
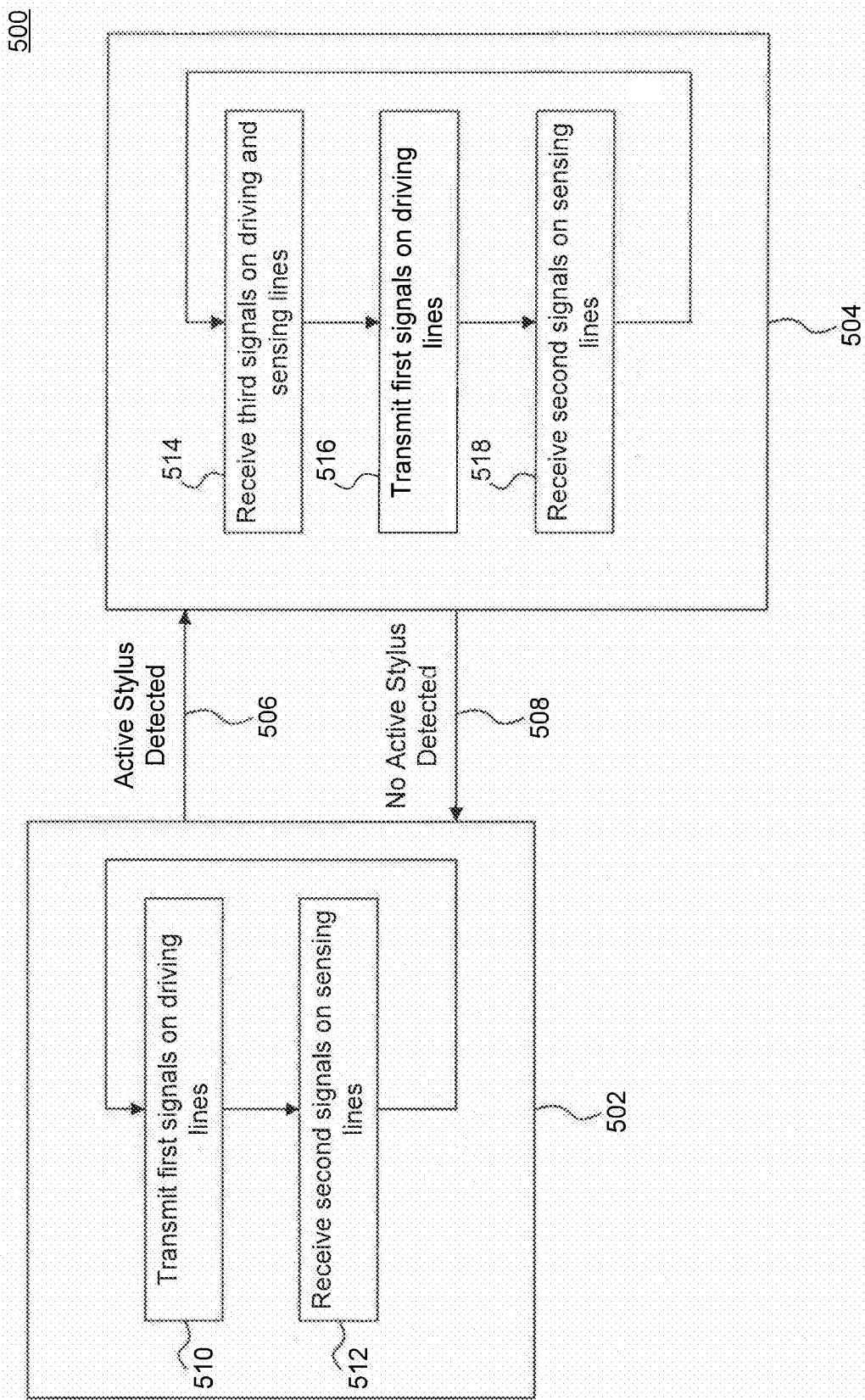
FIG. 5 is a flowchart of an example process for operating a hybrid MTC and active stylus touch system according to an embodiment.

Demodulation module 420 demodulates signal 426 and stores any demodulated information 434 in FIFO buffer 424. FIFO buffer is accessed by another processor (e.g., software) to generate information signal 330. In addition, demodulation module 420 provides the demodulated information 434 to tracking module 422. Tracking module 422 processes demodulated information 434 and provides configuring parameters to module 414 based on demodulated information 434. For example, in an embodiment, the active stylus communicates information to system 400 to assist system 400 lock to the active stylus. The information is extracted by demodulation module 420 and provided to tracking module 422 in the form of demodulated information 434. Tracking module 422 generates configuring parameters to module 414 based on the extracted information, FIG. 5 is a flowchart of an example process 500 for operating a hybrid MTC and active stylus touch system according to an embodiment. Example process 500 may be performed in example systems 300 and 400 described above. Example process 500 is provided for the purpose of illustration and is not limiting of embodiments.

As shown in FIG. 5, example process 500 includes two states 502 and 504, which correspond to respective operating modes of the touch system. In particular, state 502 corresponds to the system operating in an MTC mode and passively searching for active styluses in proximity to the system grid. State 504 corresponds to the system operating in a hybrid MTC and active stylus mode, where both normal MTC processing and active stylus detection and tracking are performed.

In state 502, example process 500 performs steps 510 and 512 in a looping sequence, where step 510 includes transmitting first signals on driving lines of the system grid and step 512 includes receiving second signals on sensing lines of the system grid. In an embodiment, steps 510 and 512 are performed concurrently or separately in a periodic cycle. MTC processing based on the second signals follows as described above to detect any conducting objects on the system grid. Based on the same second signals, active stylus processing is performed to detect the presence of any active styluses in proximity to the system grid. In an embodiment, the second signals are processed to determine the presence of known active styluses' signatures at known frequencies associated with active styluses. In an embodiment, the first signals are transmitted at frequencies orthogonal to the known frequencies of active styluses to enhance simultaneous detection of conducting objects and active styluses based on the second signals.

If an active stylus is detected, then in step 506, example process 500 transitions from first state 502 to second state 504. In an embodiment, the transition from first state 502 to second state 504 is triggered by detecting an active stylus signature of sufficient strength for tracking the active stylus by the system.

In state 504, example process 500 performs steps 514, 516, and 518 in a looping sequence. For example, steps 514 and 516 are performed in a first time interval of a periodic cycle and step 518 is performed in a second time interval of the periodic cycle. The first and second time intervals may or may not be equal. Further, in an embodiment, the first and second time intervals can be dynamically adjusted based on the presence/absence of a conducting object on the system grid and/or an active stylus in proximity to the system grid and/or based on the strengths of signals resulting from the presence of the conducting object and/or the active stylus.

Step 514 includes receiving third signals on the driving lines and the sensing lines. No transmission over the driving lines is performed during step 514. Active stylus processing based on the third signals is then performed to track and locate (determine (x, y, z) position) the detected active stylus relative to the system grid. Additional processing to data demodulate the third signals may also be performed as described above. Subsequently, example process 500 proceeds to step 516, which includes transmitting first signals on the driving lines, and then to step 518, which includes receiving second signals on the sensing lines. MTC processing based on the second signals follows as described above to detect any conducting objects on the system grid. The same second signals may also be used to continue to track and locate the detected active stylus.

While in state 504, if the previously detected active stylus can no longer be detected, then in step 508 process 500 transitions from second state 504 to first state 502.

In another embodiment, process 500 is modified such that first state 502 corresponds exclusively to MTC mode processing (no passive searching of active styluses is performed in state 502) and second state 504 corresponds exclusively to active stylus mode processing, with second state 504 including a single step 514. Process 500 transitions back and forth periodically between first state 502 and second state 504. In an embodiment, a 50% duty cycle is used whereby process 500 spends equal times in states 502 and 504. In other embodiments, however, other duty cycles can be used, including fixed and dynamically configurable day cycles. For example, in an embodiment, the duty cycle is adjusted such that more time is spent in first state 502 than second state 504 (second state 504 than first state 502) if a conducting object is detected but no active stylus is detected (if an active stylus is detected but no conducting object is detected). In another embodiment, the duty cycle is adjusted based on signal-to-noise ratio (SNR) measurements performed during MTC processing and active stylus processing, so that detection and, tracking of conducting objects and/or active styluses can be enhanced.

Figure 6A:
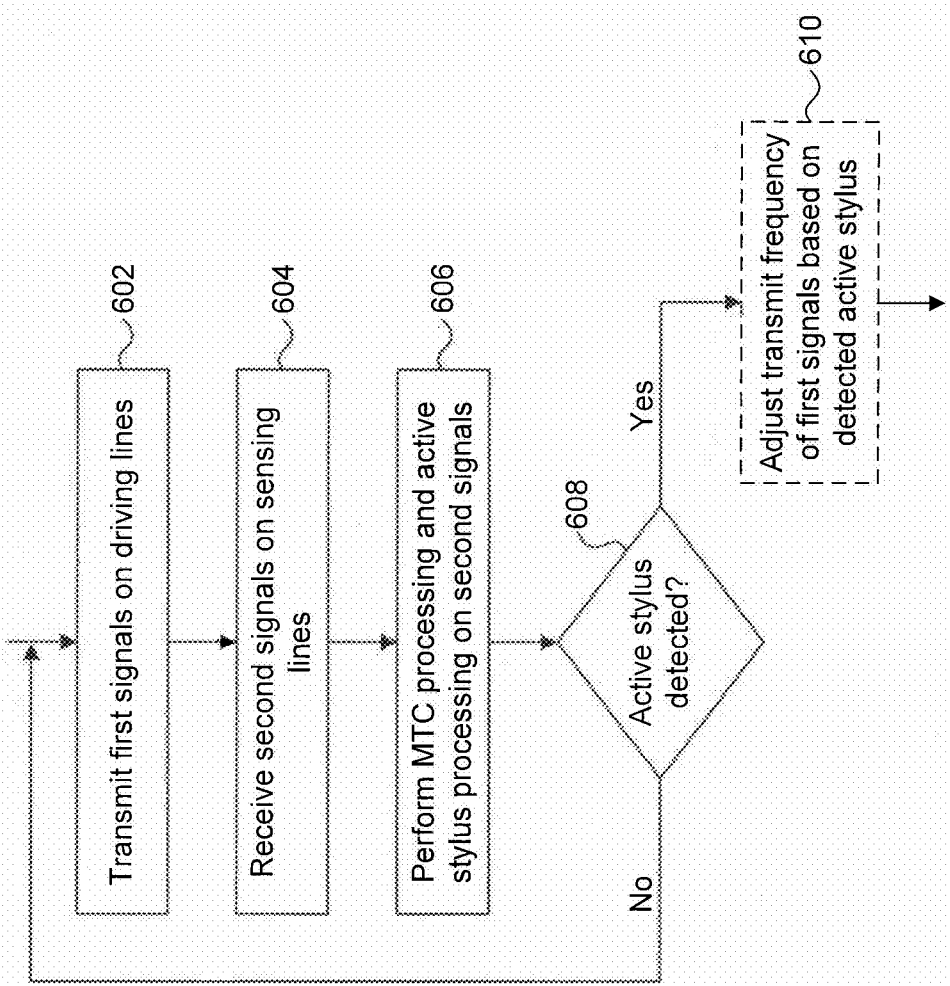
FIGS. 6A and 6B illustrate a flowchart of an example process for operating a hybrid MTC and active stylus touch system according to an embodiment.
Figure 6B:
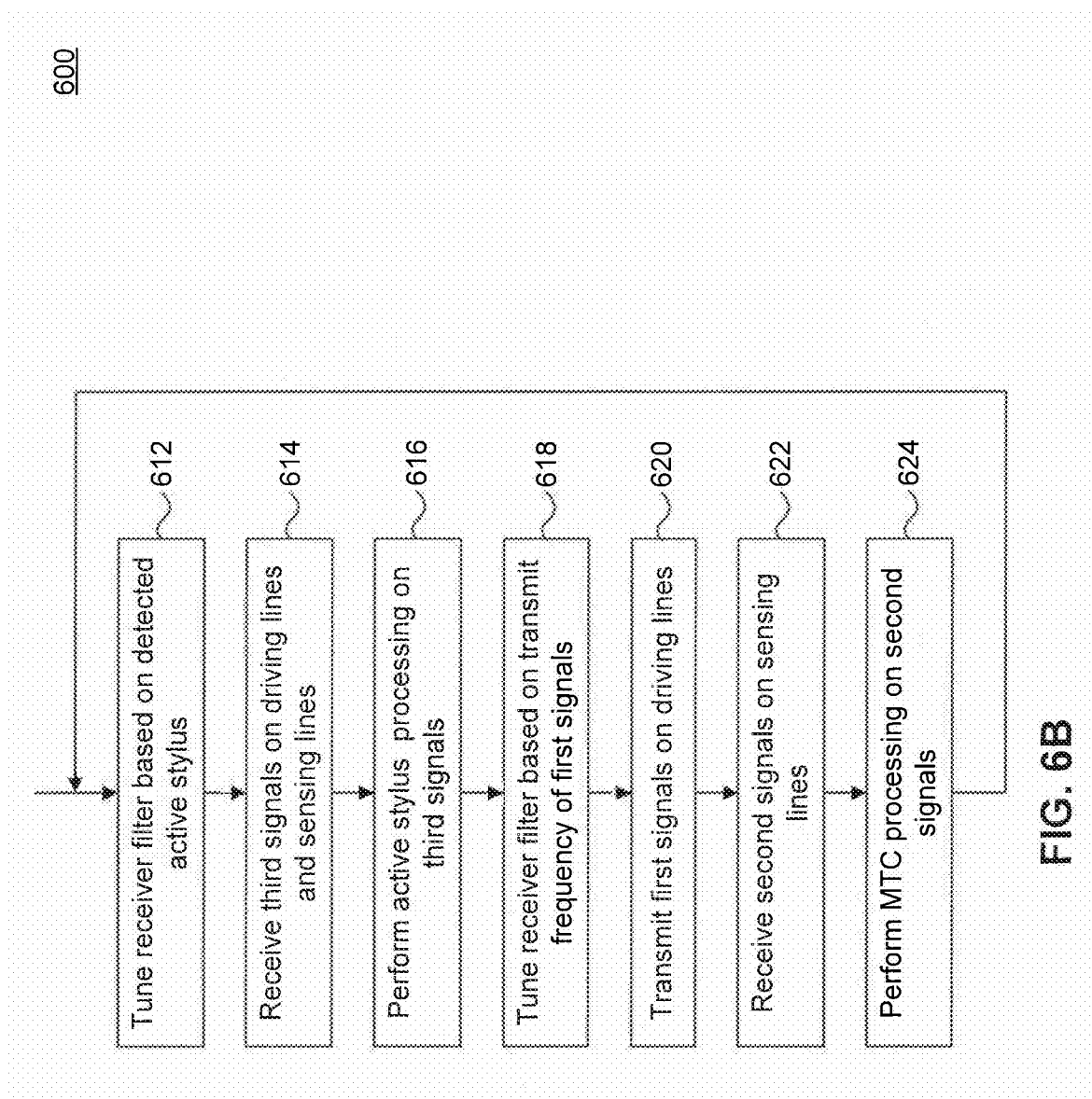

FIGS. 6A and 6B illustrate a flowchart of an example process 600 for operating a hybrid MTC and active stylus touch system according to an embodiment. Example process 600 may be performed in example systems 300 and 400 described above. Example process 600 is provided for the purpose of illustration and is not limiting of embodiments.

As shown in FIG. 6A, process 600 begins in step 602, which includes transmitting first signals on driving lines of the system. For example, with reference to FIGS. 3 and 4, step 602 includes transmitting first signals on driving lines 108. Subsequently, process 600 proceeds to step 604, which includes receiving second signals on sensing lines of the system. For example, with reference to FIGS. 3 and 4, step 604 includes receiving second signals on sensing lines 110. In an embodiment, step 602 are performed such that transmission is done sequentially on the driving lines and reception is done simultaneously on the sensing lines for every driving line.

Following step 604, process 600 proceeds to step 606, which includes performing MTC processing and active stylus processing on the second signals. In an embodiment, step 606 includes performing concurrent detection for conducting objects using MTC processing and active styluses using active stylus processing. This concurrent processing is described in FIG. 3 above, for example, whereby output signal 334 of noise filtering module 324 is provided to both MTC processing module 306 and to active stylus signal detection module 326.

Then, step 608 includes determining whether or not an active stylus has been detected by the active stylus processing performed in step 606. In an embodiment, an active stylus is detected when a known active stylus' signature is found in the received second signals, for example. If no active stylus is detected, process 600 returns to step 602. Otherwise, process 600 proceeds to optional step 610, which includes adjusting a transmit frequency of the first signals based on the detected active stylus. In an embodiment, step 610 includes adjusting the transmit frequency of the first signals (which are used for the purpose of MTC detection) to reduce interference with the signal emitted by the active stylus. For example, the transmit frequency of the first signals may be increased or decreased to avoid interfering with the carrier frequency of the active stylus.

Subsequently, process 600 proceeds to step 612, shown on FIG. 6B, which includes tuning a receiver filter based on the detected active stylus. For example, with reference to FIGS. 3 and 4, step 612 includes tuning noise filtering module 324 based on the detected active stylus for better detection and tracking of the active stylus. Subsequently, process 600 proceeds to step 614, which includes receiving third signals on both the driving lines and the sensing lines of the system. No transmission over the driving lines is performed during step 614, which allows improved detection of the active stylus based on the third signals. Then, active stylus processing is performed on the third signals in step 616. In an embodiment, the active stylus processing based on the third signals allows to locate (determine (x, y, z) position) of the detected active stylus relative to the system grid. Additional processing to data demodulate the third signals may also be performed as described above.

Subsequently, process 600 proceeds to step 618, which includes tuning the receiver filter based on the transmit frequency of the first signals. For example, with reference to FIGS. 3 and 4, step 618 includes tuning noise filtering module 324 based on the transmit frequency of the first signals for better detection and tracking of conducting objects. Then, step 620 includes transmitting the first signals on the driving lines, step 622 includes receiving the second signals on the sensing lines, and step 624 includes performing MTC processing on the second signals. These steps are similar to steps 602, 604, and 606 described above, with optionally no active stylus processing performed in step 624. Following step 624, process 600 returns to step 612.

Figure 7:
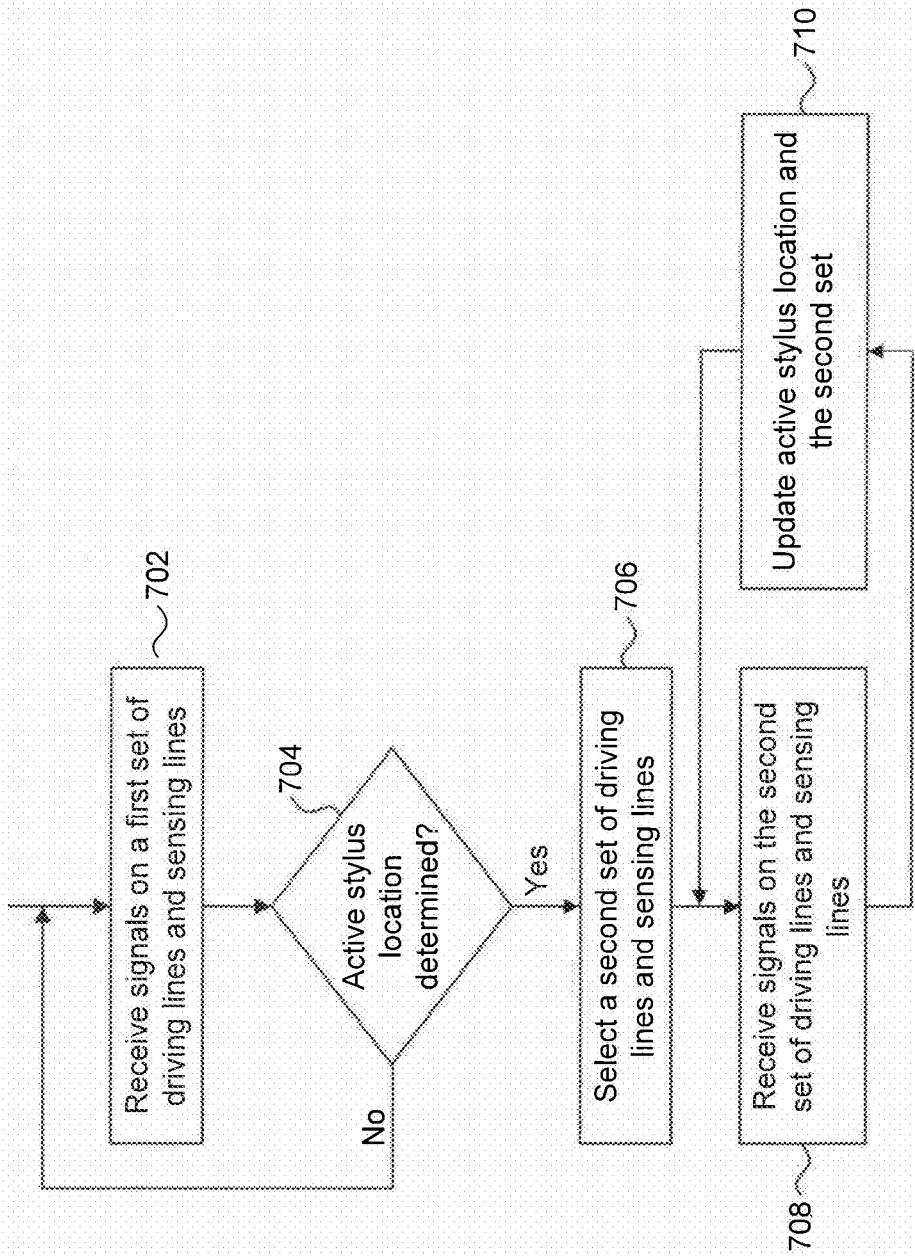
FIG. 7 is a flowchart of an example process for performing active stylus processing according to an embodiment.

FIG. 7 is a flowchart of an example process 700 for performing active stylus processing according to an embodiment. Example process 700 may be performed in example systems 300 and 400 described above. Example process 700 is provided for the purpose of illustration and is not limiting of embodiments.

As shown in FIG. 7, process 700 begins in step 702, which includes receiving signals on a first set of driving lines and sensing lines of the system. In an embodiment, the first set includes all driving lines and all sensing lines for best detection of active styluses over the system grid. Subsequently, step 704 includes determining whether or not an active stylus location is determined based on the received signals. In an embodiment, step 704 includes determining whether or not a two-dimensional position (e.g., using x and y coordinates over the system grid) of an active stylus has been found. If the answer to step 704 is no, process 700 returns to step 702. Otherwise, process 700 proceeds to step 706.

Step 706 includes selecting a second set of driving lines and sensing lines of the system. In an embodiment, the second set of driving lines and sensing lines is selected based on the determined location of the active stylus. For example, the second set is selected to cover driving lines and sensing lines that run in the immediate vicinity of the determined location of the active stylus.

Subsequently, step 708 includes receiving signals on the second set of driving lines and sensing lines. Active stylus processing on the signals received over the second set of driving lines and sensing lines is then performed. In an embodiment, the second set is smaller than the first set, and therefore a longer time can be spent processing the signal received on each driving line/sensing line in step 708 than can be done in step 702 (assuming that both steps are performed in the same overall amount of time). Better active stylus detection is therefore achieved as a result.

Following step 708, process 700 proceeds to step 710, which includes updating the active stylus location based on the active stylus processing performed on the signals received in step 708. Step 710 further includes updating the second set of driving lines and the sensing lines based on the updated location of the active stylus. Process 700 then returns to step 708 for receiving based on the updated second set of driving lines and sensing lines.

Example process 700 is described above with respect to active stylus processing. As would be understood by a person of skill in the art based on the teachings herein, example process 700 can be extended to MTC processing, whereby only a subset of driving lines and sensing lines are used to perform asymmetric scanning for conducting objects over the system grid. Furthermore, example process 700 can be extended such that it is used for both active stylus processing and MTC processing, with each type of processing performed over a respective (can be different) subset of driving lines and sensing lines of the system.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present disclosure should not be limited by any of the above-described exemplary embodiments, but should be defined only in accordance with the following claims and their equivalents.

What is claimed is:

1. A method of operating a system having a screen disposed above a grid comprising horizontal conductive lines and vertical conductive lines, the horizontal conductive lines coupled to respective driving lines and the vertical conductive lines coupled to respective sensing lines, the method comprising:
   transmitting first signals on the driving lines in a first time interval of a periodic cycle;
   receiving second signals on the sensing lines in response to the first signals in the first time interval of the periodic cycle;
   tuning a receiver filter based on a transmit frequency of the first signals prior to receiving the second signals;
   processing the second signals to detect the presence of a conductive object in contact with the screen and an active stylus in proximity to the screen;
   if the active stylus is detected in proximity to the screen, receiving third signals on the driving lines and the sensing lines in a second time interval of the periodic cycle; and
   tuning the receiver filter based on a transmit frequency of the detected active stylus prior to receiving the third signals.

2. The method of claim 1, wherein the active stylus is detected, further comprising:
   adjusting, a transmit frequency of the first signals based on a signature of the detected active stylus.

3. The method of claim 2, wherein adjusting the transmit frequency of the first signals comprises increasing or decreasing the transmit frequency of the first signals to reduce interference with a transmit frequency of the detected active stylus.

4. The method of claim 2, further comprising:
   transmitting the first signals on the driving lines in the first time interval of the periodic cycle;
   receiving the second signals on the sensing lines in response to the first signals in the first interval of the periodic cycle; and
   receiving the third signals on the driving lines and the sensing lines in the second time interval of the periodic cycle.

5. The method of claim 1, wherein the active stylus is not detected, further comprising:
   transmitting the first signals on the driving lines in the second time interval of the periodic cycle; and
   receiving the second signals on the sensing lines in response to the first signals in the second time interval of the periodic cycle.

6. The method of claim 1, further comprising processing the third signals, wherein processing the third signals comprises:
   determining a signal strength for one or more of the third signals;
   determining a location of the active stylus based on the determined signal strength; and
   data demodulating at least one of the third signals to retrieve information encoded in the third signals.

7. The method of claim 6, wherein the retrieved in information indicates a button pressed on the active stylus.

8. The method of claim 6, further comprising:
   selecting a subset of the driving lines and a subset of the sensing lines based on the active stylus location; and
   receiving fourth signals on the subset of the driving lines and the subset of the sensing lines.

9. The method of claim 8, wherein selecting the subset of the driving lines and the subset of the sensing lines based on the active stylus location includes selecting driving lines and sensing lines that are associated with an immediate vicinity of the active stylus location.

10. The method of claim 8, further comprising:
    updating the active stylus location based on the fourth signals; and
    updating the subset of the driving lines and the subset of the sensing lines based on the updated active stylus location.

11. The method of claim 1, further comprising:
    detecting the presence of the active stylus in proximity of the screen if the second signals include a matching signature of a known active stylus.

12. The method of claim 1, further comprising:
    adjusting the first time interval and the second time interval based on the processing of the second signals.

13. A system, comprising:
    a grid having a horizontal conductive line and a vertical conductive line, the horizontal conductive line coupled to a driving line and the vertical conductive line coupled to a sensing line;
    a screen disposed above the grid;
    a transmitter;
    a receiver;
    a multiplexer configured to couple the transmitter to the driving line and the receiver to the sensing line during a first time interval of a periodic cycle and to couple the receiver to the driving line and to sensing line during a second interval of the periodic cycle; and
    a filter configured according to a first carrier frequency during the first time interval and according to a second carrier frequency during, the second time interval.

14. The system of claim 13, further comprising:
    a noise measurement module configured to measure noise: and
    a spectral estimation module configured to generate configuring parameters for the filter based on the measured noise.

15. The system of claim 13, further comprising:
    a spectral estimation module configured to select a transmit frequency for the transmitter.

16. The system of claim 15, wherein the spectral estimation module selects the transmit frequency to improve detection of conducting objects based on measured noise.

17. The system of claim 13, wherein the filter comprises a band-pass filter configured to null certain harmonics.

18. The system of claim 13, wherein the receiver is an electrostatic receiver, the system further comprising:
    a radio frequency (RF) receiver; and
    a data combining module configured to combine signals received by the RF receiver and the electrostatic receiver.

19. The system of claim 13, wherein the first carrier frequency is associated with a signal transmitted by the driving line.

20. The system of claim 13, wherein the second carrier frequency is associated with a signal transmitted by an active stylus detected by the system.

* * * * *